(No Model.)
W. J. FOSTER.
STARTING DEVICE FOR ALTERNATING CURRENT MOTORS.
No. 594,150. Patented Nov. 23, 1897.
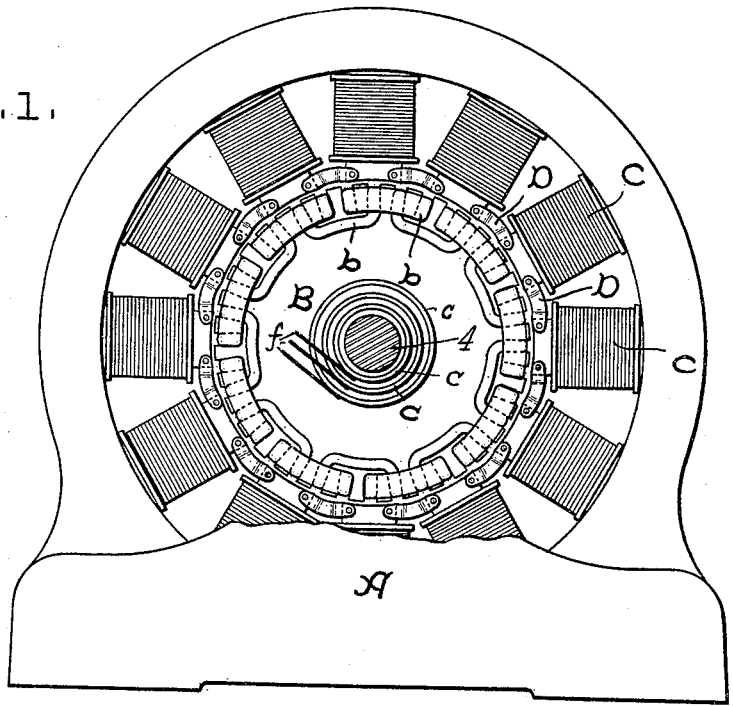
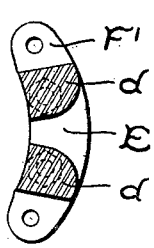
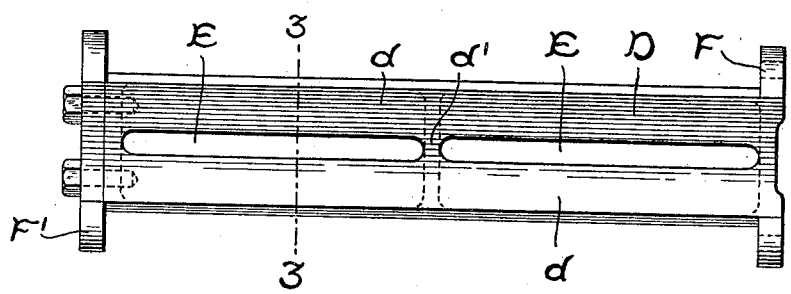
WITNESSES.
A. H. Abell.
E. Williams Jr.
INVENTOR.
William J. Foster
Geo. R. Blodgett
atty.

UNITED STATES PATENT OFFICE.

WILLIAM J. FOSTER, OF SCHENECTADY, NEW YORK, ASSIGNOR TO THE GENERAL ELECTRIC COMPANY, OF NEW YORK.

STARTING DEVICE FOR ALTERNATING-CURRENT MOTORS.

SPECIFICATION forming part of Letters Patent No. 594,150, dated November 23, 1897.

Application filed January 4, 1896. Serial No. 574,313. (No model.)

*To all whom it may concern:*

Be it known that I, WILLIAM J. FOSTER, a citizen of the United States, residing at Schenectady, in the county of Schenectady, State of New York, have invented certain new and useful Improvements in Starting Devices for Alternating-Current Motors, (Case No. 300,) of which the following is a specification.

My invention relates to alternating-current motors, and particularly to those of the synchronous type. Synchronous alternating-current motors are in general not self-starting even when supplied with multiphase currents, as the polar line of the inducing member, which is usually the rotor, rotates so rapidly that owing to the inertia of the moving parts and their inability to respond instantaneously to the magnetic attraction rapid and violent thrusts in opposite directions are produced instead of the unidirectional torque required. In attempting to start such motors it is usual to open the field-circuits and to rely upon the currents induced in the body of the pole-pieces, acting in much the same manner as the induced currents in the armature of an induction-motor, to furnish the required torque; but it is usual to build the field-magnets of such motors with polar projections which tend, even when unexcited, to lock the rotor in its position, particularly when it happens to have stopped at a dead-point. In addition the polar faces of the field, particularly when the machine is built with laminated poles, are not well adapted to be the seat of induced currents. I avoid these difficulties and provide a synchronous motor which will start under considerable load with unexcited field-magnets by placing between each of the polar projections of the field-magnet or induced member a magnetic bridge, preferably of such form as to provide a good path for the induced currents. This bridge acts in two ways—first, to do away with the sharp lines of magnetism emanating from the pole-pieces and avoid dead-points, and, second, to add to the strength and effect of the induced currents.

The particular device which I have employed is illustrated in the accompanying drawings, in which—

Figure 1 is a side elevation, partly broken away, of a synchronous motor embodying the invention. Fig. 2 is a plan of one of the bridges or magnetizable coils which I employ. Fig. 3 is a section on the line 3 3 of the parts shown in Fig. 2.

A is the base of the machine. B is its armature or inducing member, shown in this case as the rotor.

C C are the field-poles, and D D are the bridges or coils.

The armature B is shown diagrammatically as consisting of a core wound with an inducing-winding $b$, connected to rings $c$ and brushes $f$ in the usual way. Any preferred type of armature may be employed, as is well known in the art. It is evident that the armature, as shown, is intended for three-phase current, but I do not restrict myself thereto.

4 is the shaft of the machine.

In Fig. 2 the bridges are shown as composed of a bar of iron, conforming approximately to the curvature of the armature. Through the middle of the bar I prefer to provide slots E E, thus forming, with the sides $d$ $d$ and a central portion $d'$, two short-circuited coils of magnetizable material. End pieces F F', by which the bar may be conveniently attached to the field-poles, are also provided and secured to the bridge by means of bolts or in any other suitable way. For this any other approved construction may be adopted.

I understand the action to be as follows: Current is admitted to the inducing member B through the rings $c$, preferably with unexcited field-magnets. A rotating polar line is produced, which induces in the polar faces and in the short circuits formed by the bridges currents which react on the inducing member to produce torque, as in an ordinary induction-motor. As the magnetic ring in which the armature is placed is practically continuous, there are no dead-points. The armature soon attains such speed that the field-magnets may be excited, and when this is done the slip becomes zero, so that the losses due to currents in the bridges become very small.

The advantages which result from placing the short-circuited coil or bridge D between the polar projections instead of winding such a coil in slots in the polar faces, as has been formerly proposed, are two. First, by placing it between the polar projections the coil is able to act, if it is formed of magnetic material, both as a starting-coil and as a magnetic bridge, as above set forth, and, second, that in this way I avoid the necessity of slitting the polar faces, which tends to add to the resistance of the magnetic circuit by adding to the average width of the air-gap, and also causes an irregularity in the flux through the inducing member or armature. In addition, my invention may be readily applied to existing motors, which is a great advantage.

It is evident that various forms may be given to the bridge and that it may be employed in connection with various types of machines. I therefore do not restrict myself to the particular forms shown and described; but I claim as my invention and desire to secure by Letters Patent—

1. As a means of increasing the starting torque of a synchronous alternating-current motor, a bridge of magnetic material adjacent to the polar faces of the induced member, substantially as described.

2. As a means of increasing the starting torque of a synchronous motor, a short-circuited coil between two of the polar faces of the field-magnets, substantially as described.

3. As a means of increasing the starting torque of a synchronous motor, a short-circuited coil of magnetizable material adjacent to the polar faces, substantially as described.

4. As a means of increasing the starting torque of a synchronous motor, a short-circuited coil of magnetizable material, placed between two of the polar faces of the field-magnet, and serving both to preserve the magnetic continuity of the field-ring and to furnish an induced current for starting the motor, substantially as described.

5. As a means of increasing the starting torque of an alternating-current motor, a bridge of magnetic material adjacent to the faces of the polar projections of the induced member, and fixed with relation thereto.

In witness whereof I have hereunto set my hand this 30th day of December, 1895.

WILLIAM J. FOSTER.

Witnesses:
B. B. HULL,
A. F. MACDONALD.